United States Patent Office 3,093,549
Patented June 11, 1963

3,093,549
PREPARATION OF METHOXYNOVOBIOCIN
Karl Folkers and H. Boyd Woodruff, Plainfield, N.J., assignors to Merck & Co., Inc., Rahway, N.J., a corporation of New Jersey
No Drawing. Filed Apr. 4, 1958, Ser. No. 726,320
4 Claims. (Cl. 195—80)

This invention relates to the production of new antibiotic compounds by fermentation. More particularly, it is concerned with new antibiotic compounds related to novobiocin and methods of producing such compounds.

It is an object of this invention to provide a method for the preparation of new antibiotic compounds by fermentation. It is a further object to provide a method of preparing methoxynovobiocin. Other objects will be apparent from the detailed description of my invention hereinafter provided.

In accordance with the present invention, it is now found that the addition of a small amount of a substituted benzoic acid compound to fermentation mediums in which a novobiocin producing strain of Streptomyces is grown results in the production of new antibiotics related to novobiocin. These new antibiotics differ from novobiocin structurally and in activity against various pathogenic organisms.

For the production of these new novobiocin analogues, a novobiocin-producing strain of *Streptomyces spheroides* is particularly suitable. A useful culture for our processes has been deposited in the Northern Regional Research Laboratory, where it bears the designation NRRL 2449. It is to be understood that the process of this invention is not limited to this specific organism, but that other organisms, mutants or otherwise, that form novobiocin-like compounds can also be used for the production of the new antibiotic compounds.

The methods of our invention can be specifically illustrated by the production of the new antibiotic, herein referred to as methoxynovobiocin. This new antibiotic has the following structural formula:

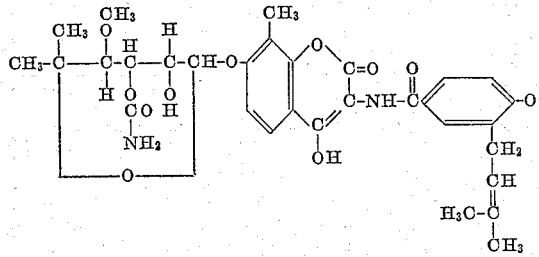

This new antibiotic is produced by growing a novobiocin producing strain of Streptomyces in suitable culture mediums in the presence of a small amount of 4-methoxy-3-(3-methyl-2-butenyl) benzoic acid. The resulting fermentation broth contains novobiocin and methoxynovobiocin. These antibiotics can be recovered from the fermentation broth and separated to obtain methoxynovobiocin in crystalline form.

The optimum concentration of the precursor, 4-methoxy-3-(3-methyl-2-butenyl)-benzoic acid, will depend, in part, upon the particular fermentation medium used. In general, it is found that a concentration of this precursor in excess of about $\frac{1}{10}$ mgm. per ml. in the fermentation medium exhibits the growth of the microorganism. Usually, it is found that in synthetic mediums concentrations of about 0.05 mgm. per ml. or lower is satisfactory and results in broths containing satisfactory amounts of the desired methoxynovobiocin.

In carrying out the processes of this present invention, it is found that the precursor can be added either directly to the fermentation medium prior to sterilization and cultivation of the medium with the novobiocin producing strain of Streptomyces or after the fermentation has started. Generally, we prefer to add the precursor to the sterilized medium aseptically during the actual fermentation period. Thus, an aseptic solution of the precursor in water or in other similar solvents such as in alcohol can be added to the fermentation broth after two days of fermentation when the actual production of novobiocin starts. Such aseptic solutions of the precursor are prepared by passing the solution through a porcelain candle of the Selas type.

After completion of the fermentation, the fermented broth which contains both novobiocin and methoxynovobiocin is treated to first recover the antibiotic compounds and the antibiotic compounds so obtained are separated by suitable means such as partition chromatography.

The methoxynovobiocin produced in accordance with our processes is active against a number of micro-organisms such as Staphylococcus sp., Pseudomonas sp., *E. coli*, *Proteus vulgaris*, *Streptococcus fecalis*, *Salmonella typhosa*, and the like.

The following example illustrates methods of producing methoxynovobiocin.

Example

A yeast extract-dextrose agar adjusted to a pH of about 7.0 was sterilized, cooled, and inoculated with *Streptomyces spheroides* NRRL 2449 from a soil tube. The yeast extract-dextrose slants were then incubated at 28° C. for about seven days until the cultures were well sporulated. The sporulated slants were then stored at 4–8° C. until needed. The yeast extract-dextrose agar was made up in tap water and contained the following:

|  | Percent |
|---|---|
| Difco yeast extract | 1.0 |
| Dextrose | 1.0 |
| $MgSO_4 \cdot 7H_2O$ | 0.05 |
| Agar | 2.0 |

.67 M $Na_2HPO_4$—$KH_2PO_4$ (pH 7), 2.0% (by volume).

The further development of inoculum was contained in a distillers' solubles medium containing 3% of distillers' solubles and 2.0% of dextrose in tap water; the pH of the medium being adjusted to about 7.0–7.2. Forty ml. of this medium was placed in 250 ml. Erlenmeyer shake flasks and the flasks and contents sterilized by heating in an autoclave at about 120° C. for about twenty minutes. After cooling the sterilized flasks are inoculated by transferring a heavy conidial inoculum from the yeast extract-dextrose slants. The flasks and contents were then incubated at 28° C. for 3 days on a rotary shaker (220 r.p.m.).

The medium, a proline-glucose medium, for the production of methoxynovobiocin was prepared by dissolving the following in tap water:

|  | Percent |
|---|---|
| L-proline | 1.0 |
| Glucose | 1.0 |
| NaCl | 0.5 |
| $K_2HPO_4$ | 0.2 |
| $MgSO_4 \cdot 7H_2O$ | 0.1 |
| $CaCl_2 \cdot 2H_2O$ | 0.04 |
| $FeSO_4 \cdot 7H_2O$ | 0.02 |
| $ZnSO_4 \cdot 7H_2O$ | 0.01 | and adjusting the solution to a pH of 7.0–7.2 before use.

Forty ml. of this medium was dispensed in 250 ml. Erlenmeyer shake flasks, and the flasks and contents sterilized by heating in an autoclave at about 120° C. for about twenty minutes. The cooled sterilized medium was then inoculated with one ml. of vegetative inoculum prepared in the distillers' solubles medium described above. The flasks were set up in triplicate and were incubated at 25° C. in a rotary shaker (220 r.p.m.).

After 3 days' preliminary incubation of a set of inoculated proline-glucose-salts synthetic medium, good growth was observed. To one set of these fermentation cultures, the indicated concentrations of 4-methoxy-3-(3-methyl-2-butenyl)benzoic acid were added aseptically. Another set was left intact without the addition of a precursor to serve as a control unit.

Antibiotic assays were performed on the fermentation broths on the 6th and 7th days of incubation. On the 7th day, all flasks were harvested and the supernatants after centrifuging were developed on the chromatographic paper. Crystalline novobiocin and dihydronovobiocin were also developed as standard reference controls of the bioautograms. The results recorded in Table 1 indicated production of a new novobiocin-like antibiotic, along with some novobiocin in certain instances.

Table 1

| 4-methoxy-3-(3-methylbutenyl) benzoic acid, mgm./ml. | Avg. total activity, μg./ml. | Mobility bioautograms |
|---|---|---|
| 0.1 | 115 | 0.83. 1.00. |
| 0.05 | 193 | 0.84 (large zone). 1.00 (trace). |
| 0.02 | 152 | 0.83 (small zone). 1.00 (large zone). |
| 0 | 211 | 1.00. |
| Novobiocin standard | | 1.00. |
| Dihydronovobiocin standard | | 0.60. |

The new antibiotic product obtained in accordance with the above-described procedures was demonstrated to be methoxynovobiocin.

Methoxynovobiocin was recovered from fermentation broths obtained by growing *Streptomyces spheroides* NRRL 2449 in mediums containing the precursor 3-(3-methyl-2-butenyl)-4-methoxy-benzoic acid by the following procedures:

About one and one half liters of fermentation broth which was estimated to contain approximately equal amounts of novobiocin and methoxynovobiocin by paper strip chromatography was filtered with diatomaceous earth. The resulting filter broth having an activity of about 115 γ/ml. as determined by *B. subtilis assay*, was extracted successively with 250 ml., 170 ml., 140 ml., 150 ml. and 200 ml. of ethyl acetate. The ethyl acetate extracts were extracted three times with 150 ml. of petroleum ether and the extracts discarded. The residue was dissolved in 100 ml. of methanol and adjusted to pH 7.

The filter cake from the filtration of the original broth was extracted successively with 1000 ml. and then 500 ml. of ethyl acetate. The ethyl acetate extracts were concentrated in vacuo to a yellow oil and a solid residue. This mixture was extracted with 3 x 50 ml. portions of neutralized water and equal volumes of petroleum ether. The residue after this extraction was dissolved in about 100 ml. of ethanol, cooled and the yellow solution filtered to remove the precipitated white solid.

The resulting ethanol solution (about 85 ml.) was combined with the 100 ml. of methanol solution obtained from the extraction of the filtered fermentation broth. The combined extracts were concentrated in vacuo, and the residue so obtained was dissolved in 25 ml. of warm methanol and cooled. The cooled solution was filtered to remove the precipitated white solid. About seven ml. of the filtrate was evaporated to dryness in a stream of nitrogen and the resulting residue was dissolved in about 3 ml. of ½ molar phosphate buffer having a pH of about 8.5. The resulting solution was poured onto a column (12 mm. diameter and about 2 ft. long) of chlorosilone-treated silicic acid. The silicic acid column was developed with phosphate buffer and fractions of about 8 ml. (⅓ of the retention volume of the column) collected on a fraction collector.

Fractions 51–65 were combined making a total volume of 125 ml. and washed twice with 25 ml. of petroleum ether. The aqueous solution was extracted twice with 25 ml. portions of ethyl acetate and the ethyl acetate extracts evaporated to dryness. The residue was dissolved in about 4 ml. of acetone and about 24 ml. of petroleum ether added thereto. The resulting turbid solution was cooled whereupon the methoxynovobiocin precipitated and was recovered by filtration.

A solution of methoxynovobiocin had the following characteristic peaks:

| λ | E, percent |
|---|---|
| 3040 (max.) | 345 |
| 2540 (max.) | 308 |
| 2400 (shoulder) | 269 |
| 2300 (min.) | 246 |
| 2250 (end abs.) | 287 |

The infrared absorption spectrum was similar to that of novobiocin, except it showed no 3.1μ phenolic-OH band, and some differences in longer wavelengths.

The precursor used in the foregoing example was prepared as follows:

Ethyl 4-hydroxy-3-(3-methyl-2-butenyl)-benzoate was dissolved in 10 ml. of water and 5 ml. of 2.5 N sodium hydroxide. The solution was cooled in an ice bath and stirred. Dimethylsulfate (0.45 ml.) was added. After 0.5 hr. an additional 0.40 ml. of dimethylsulfate was added. The mixture was stirred for 0.5 hr. longer and then 6 ml. of 30% sodium hydroxide solution was added. This mixture was heated on the steam bath until a solution was obtained. The resulting solution containing 4-methoxy-3-(3-methyl-2-butenyl)-benzoic acid was cooled and saturated with carbon dioxide. After extraction with ether, the aqueous solution was acidified with hydrochloric acid and extracted with ether. This ether extract was dried over magnesium sulfate, filtered and concentrated under reduced pressure. The residue was crystallized from methanol-water giving a product melting at 115–124°. Recrystallization from methanol-water raised the melting point to 127–128°.

*Analysis.*—Calculated for $C_{13}H_{16}O_3$: C, 70.87; H, 7.32. Found: C, 70.79; H, 7.10.

Other new antibiotics can be prepared by the procedures described above for the production of methoxynovobiocin using the appropriate precursor in the fermentation broth. Examples of such precursors which can be used to produce the corresponding novobiocin-like compound that might be mentioned are: 3-allyl-4-hydroxy-benzoic acid, 3-(2-butenyl)-4-hydroxy-benzoic acid, 3-(α-methylallyl)-4-hydroxy-benzoic acid, 3-allyl-4-methoxy-benzoic acid, 3-methyl-4-hydroxy-benzoic acid, 3-(3-methyl-2-butenyl)-4-ethoxy-benzoic acid, 3 - (3-phenylpropyl)-4-hydroxy-benzoic acid, 3-n-butyl-4-hydroxy-benzoic acid, 3,4-dichloro-4-hydroxy-benzoic acid, 3 - (γ-methylallyl)-4-hydroxy-benzoic acid, 3-ethyl-4-hydroxy-benzoic acid, 3-amyl - 4 - hydroxy - benzoic acid, 3 - isobutyl-4-hydroxy-benzoic acid, 3-hexyl-benzoic acid, 3-(2,3-dichloropropyl)-4-methoxy-benzoic acid, and the like.

Thus, when these precursors are added to the fermentation broths in the manner described above for the preparation of broths containing methoxynovobiocin, the corresponding new novobiocin-like compounds are produced. Similarly, in the manner described for the separation of methoxynovobiocin, these new novobiocin-like products were produced in substantially pure form.

Ultraviolet and infrared spectral measurements were used to establish the novobiocin nature of these new novobiocin-like compounds.

In the infrared, the spectra of these products showed minor differences from novobiocin at the longer wavelengths, as would be expected, but were identical with novobiocin in the double bond region as required.

The ultraviolet spectra, which were measured in neutral and alkaline solution, were found to be the same as that of novobiocin. In the instances where the 4-position of the substituted benzoic acid moiety was alkylated, however, no differences in spectrum between neutral and alkaline medium was observed as would be expected, whereas novobiocin and those analogs with the free acidic 4-hydroxyl group exhibit a characteristic shift.

The new novobiocin-like compounds of this invention differ in biological properties from novobiocin. The antibiotic spectrum of each crystalline product obtained has been determined and varies in an unpredictable manner from that of novobiocin. Certain analogues have lower activity for one microorganism, for example *Micrococcus pyogenes* var. *aureus*; higher activity for other microorganisms, for example, *Bacillus subtilis* and *Proteus vulgaris*; and are unchanged for others, such as *Escherichia coli*. Therefore, through operation of the process disclosed in this application, specific new antibiotics may be prepared designed especially for a specific end use, for example, treatment of a disease caused by a microorganism having high sensitivity to a specific antibiotic. Another utility of these analogues is in the field of food preservation. Novobiocin has shown utility in prevention of staphylococcal food poisoning of products containing cream fillings. It is not desirable to employ an antibiotic used clinically as a food preservative. Through the process disclosed herein it is possible to prepare analogues of novobiocin designed expressly for the food field.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the production of methoxynovobiocin which comprises growing a novobiocin producing strain of Streptomyces in a culture medium in the presence of 3-(3-methyl-2-butenyl)-4-methoxybenzoic acid to produce methoxynovobiocin.

2. The process of claim 1 wherein the strain of Streptomyces is *Streptomyces spheroides*.

3. A process for the preparation of methoxynovobiocin which comprises growing a novobiocin producing strain of Streptomyces in a culture medium in the presence of a minor amount of 3-(3-methyl-2-butenyl)-4-methoxy benzoic acid to produce methoxynovobiocin, and separating and recovering methoxynovobiocin.

4. The process of claim 3 wherein the strain of Streptomyces is *Streptomyces spheroides*.

References Cited in the file of this patent

UNITED STATES PATENTS 2,796,383    Robinson _____ June 18, 1957

OTHER REFERENCES

Hinman et al.: J.A.C.S., 79 (July 1957), pages 3789–3800.